United States Patent [19]

Fox et al.

[11] Patent Number: 5,363,160
[45] Date of Patent: Nov. 8, 1994

[54] CAMERA IN WHICH A LIGHT BLOCKING SHIELD IS AUTOMATICALLY MOVED TOWARDS A NORMAL POSITION AS A MOVABLE LENS MOUNT IS RETRACTED TO A STORAGE POSITION

[75] Inventors: Myron E. Fox, Spencerport; Richard A. Gates, Hilton, both of N.Y.

[73] Assignee: Eastman Kodak Company, Rochester, N.Y.

[21] Appl. No.: 90,850

[22] Filed: Jul. 12, 1993

[51] Int. Cl.$^5$ .................................................. G03B 37/00
[52] U.S. Cl. ................................... 354/94; 354/159; 354/195.1
[58] Field of Search ....................... 354/94, 159, 195.1

[56] References Cited

U.S. PATENT DOCUMENTS

| | | | |
|---|---|---|---|
| 2,247,104 | 6/1941 | Takacs et al. | 354/159 |
| 3,678,834 | 7/1972 | Melillo | 354/159 |
| 4,249,812 | 2/1981 | Hall | 354/159 X |
| 4,357,102 | 11/1982 | Taren et al. | 354/159 X |
| 4,384,774 | 5/1983 | Tuck | 354/159 |
| 4,583,831 | 4/1986 | Harvey | 354/195.1 |
| 4,611,895 | 9/1986 | Seely | 354/159 |
| 4,716,427 | 12/1987 | Shyu | 354/159 |
| 5,010,357 | 4/1991 | Misawa | 354/159 |
| 5,066,971 | 11/1991 | Kodaira | 354/159 X |
| 5,086,311 | 2/1992 | Naka et al. | 354/195.1 |
| 5,258,790 | 11/1993 | Tanaka | 354/94 |

Primary Examiner—Michael L. Gellner
Assistant Examiner—J. K. Han
Attorney, Agent, or Firm—David A. Hawley

[57] ABSTRACT

An improvement is provided in a camera having a movable lens mount for supporting a taking lens. The improvement includes at least one light blocking shield which is movable between (1) a panoramic position in which light passing through the taking lens is partially blocked from reaching a photographic film such that a vertically reduced panoramic image can be recorded on the photographic film and (2) a normal position in which light passing through the taking lens is not blocked by the light blocking shield such that a normal image can be recorded on the film. The light blocking shield is automatically moved towards the normal position as the movable lens mount is being retracted into a storage position such that the movable lens mount can be fully retracted into the storage position without interference from the light blocking shield.

5 Claims, 1 Drawing Sheet

CAMERA IN WHICH A LIGHT BLOCKING SHIELD IS AUTOMATICALLY MOVED TOWARDS A NORMAL POSITION AS A MOVABLE LENS MOUNT IS RETRACTED TO A STORAGE POSITION

FIELD OF THE INVENTION

This invention relates generally to the field of photography, and more particularly to cameras which can record panoramic images. Specifically, the invention relates to a camera in which a light blocking shield is automatically moved towards a normal position as a movable lens mount is retracted to a storage position.

BACKGROUND OF THE INVENTION

U.S. Pat. No. 5,086,311, which issued in the name of Naka et al. on Feb. 4, 1992, discloses a panoramic camera having masking plates which are selectively movable for masking an exposure aperture so as to form a picture frame of a panoramic size or for opening the whole exposure aperture. A plate actuating mechanism provided on the fixed lens mount selectively sets the masking plates in either the full size position or the panoramic position.

The Naka camera includes a taking lens of the collapsible mount type having movable and fixed lens mounts. A guide groove formed on the movable lens mount engages with a pin formed on an operating knob upon retracting the movable lens mount into the fixed lens mount for carrying. The masking plates are thereby automatically moved into the panoramic position when the movable lens mount is retracted into a storage position.

PROBLEM TO BE SOLVED BY THE INVENTION

A problem with the Naka camera is that by moving the masking plates into the panoramic position when retracting the movable lens mount for carrying, the movable lens mount can only be retracted up to the front surface of the masking plates (see FIG. 6 of Naka). As such, the camera is limited in how compact it can be made when placed in a storage mode because the movable lens mount cannot be retracted past the masking plates. With the desire to make cameras more and more compact while providing an ever increasing array of features, such a limitation is a disadvantage in a camera.

SUMMARY OF THE INVENTION

According to one aspect of the invention, an improvement is provided to a camera having a movable lens mount for supporting a taking lens. The improvement includes at least one light blocking shield which is movable between (1) a panoramic position in which light passing through the taking lens is partially blocked from reaching a photographic film such that a vertically reduced panoramic image can be recorded on the photographic film and (2) a normal position in which light passing through the taking lens is not blocked by the light blocking shield such that a normal image can be recorded on the film. The light blocking shield is automatically moved towards the normal position as the movable lens mount is being retracted into a storage position such that the movable lens mount can be fully retracted into the storage position without interference from the light blocking shield.

ADVANTAGEOUS EFFECT OF THE INVENTION

In the present invention, the light blocking shield is moved towards the normal position as the movable lens mount is retracted into the storage position. As such, the light blocking shield does not limit how far the movable lens mount is retracted. Consequently, the movable lens mount can be retracted further into the camera, allowing the camera to assume a more compact shape when in a storage mode.

DETAILED DESCRIPTION OF THE INVENTION

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Figure 1:
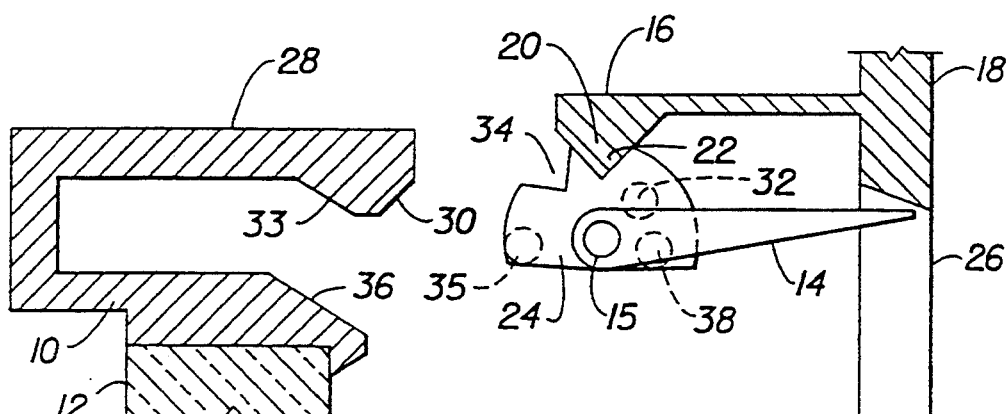
FIG. 1 is a side view of a portion of a camera with a movable lens mount and a light blocking shield, both in a normal picture taking position.

Referring now to the drawings, FIG. 1 shows a movable lens mount 10 which supports a taking lens 12. The movable lens mount and lens are shown in a normal picture taking position. A light blocking shield 14 is also shown in a normal position. The light blocking shield is mounted for rotation to a shaft 15 which is secured to a portion (not shown) of a camera frame 18. The light blocking shield is held in the normal position by a flexible detent 16. One end of the detent is secured to camera frame 18. The other end of the detent has a wedge shaped section 20 which engages a similarly shaped first wedge shaped opening 22 in a semicircular disk 24. Disk 24 is secured to an end of shield 14 and moves with the shield.

In the normal position, the light blocking shield does not block any light passing through taking lens 12 from reaching a film plane 26 where a photographic film is located. As such, a "normal" image is recorded on the photographic film.

Figure 2:
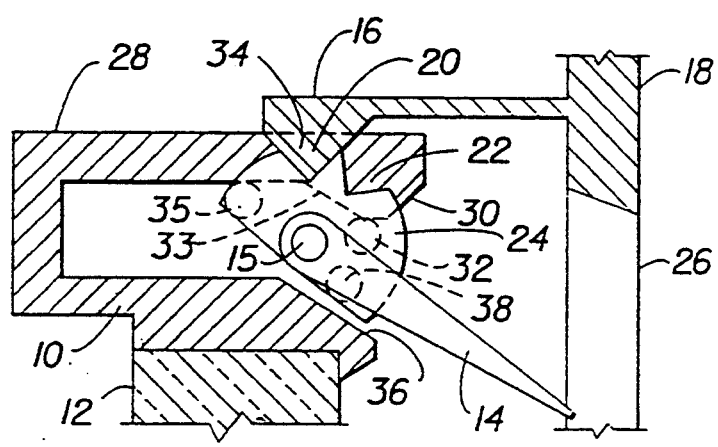
FIG. 2 is a view similar to FIG. 1, except that the movable lens mount is in a wide angle position and the light blocking shield is in a panoramic position.

Turning now to FIG. 2, lens mount 10 has been retracted to a location such that lens 12 is now in a wide angle position. An extension 28 of lens mount 10 includes a surface 30. As the lens mount is retracted to the wide angle position, surface 30 engages the surface of a pin 32. The interaction of surface 30 and pin 32 causes shield 14 to rotate clockwise to a panoramic position shown in FIG. 2. As shield 14 is rotated from the normal position to the panoramic position, wedge shaped section 20 is forced out of first wedge shaped opening 22. As the shield continues to rotate, the wedge shaped section engages a second wedge shaped opening 34, thereby holding shield 14 in the panoramic position.

In the panoramic position, the light blocking shield partially blocks light passing through taking lens 12 from reaching film plane 26 where a photographic film is located. As such, a vertically reduced, panoramic image is recorded on the photographic film when the taking lens is in the wide angle position.

When the lens mount is moved from the wide angle position (FIG. 2) towards a normal or telephoto position (FIG. 1), a surface 33 on extension 28 engages a pin 35 on disk 24. The interaction of surface 33 and pin 35 cause shield 14 to rotate counterclockwise back to normal position shown in FIG. 1. As shield 14 is rotated from the panoramic position to the normal position, wedge shaped section 20 is forced out of second wedge shaped opening 22. As the shield continues to rotate, the wedge shaped section engages first wedge shaped opening 34, thereby holding shield 14 in the normal position.

Figure 3:
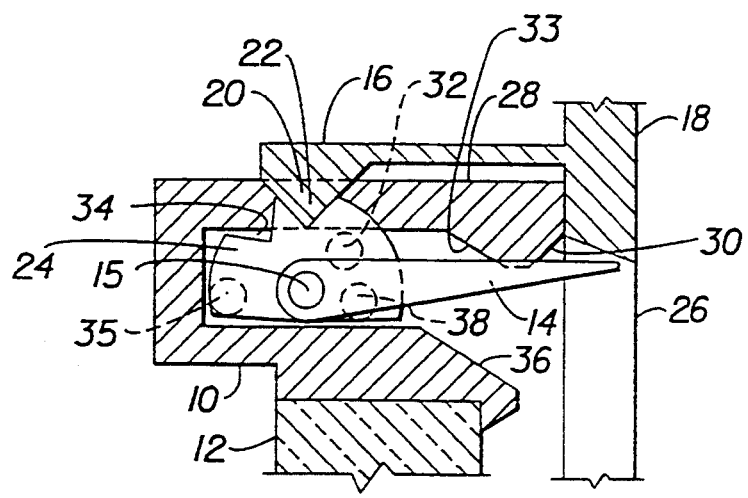
FIG. 3 is a view similar to FIG. 2, except that the movable lens mount is retracted into a storage position and the light blocking shield is in a normal position.

Referring to FIG. 3, lens mount 10 has been retracted into a storage position from the wide angle position. As the lens mount is retracted into the storage position, a surface 36 on lens mount 10 engages a second pin 38 on disk 24. The interaction of surface 36 and pin 38 cause shield 14 to move or rotate counterclockwise back towards a normal position shown in FIG. 3. As shield 14 is rotated from the panoramic position towards the normal position, wedge shaped section 20 is forced out of second wedge shaped opening 22. As the shield continues to rotate, the wedge shaped section engages first wedge shaped opening 34, thereby holding shield 14 in the normal position.

The invention has been described with reference to a preferred embodiment. However, it will be appreciated that variations and modifications can be effected by a person of ordinary skill in the art without departing from the scope of the invention. Although only one light blocking shield is shown, a second light blocking shield may be used to mask a lower portion of the film plane. Movement of the lower shield can be linked to movement of the upper shield or the lower shield can be moved independently according to movement of the movable lens mount using structure similar to that used to move the upper light shield.

What is claimed:

1. In a camera having a movable lens mount for supporting a taking lens, the improvement comprising:

at least one light blocking shield which is movable between (1) a panoramic position in which light passing through said taking lens is partially blocked from reaching a photographic film such that a vertically reduced panoramic image can be recorded on the photographic film and (2) a normal position in which light passing through said taking lens is not blocked by said light blocking shield such that a normal image can be recorded on said film; and means for automatically moving said light blocking shield towards said normal position as said movable lens mount is being retracted into a storage position such that said movable lens mount can be fully retracted into said storage position without interference from said light blocking shield.

2. The camera of claim 1, wherein said moving means automatically positions said light blocking shield in said panoramic position when said movable lens mount is moved to a wide-angle position.

3. The camera of claim 1, wherein said moving means automatically positions said light blocking shield in said normal position when said movable lens mount is moved from a wide-angle position towards a telephoto position.

4. The camera of claim 1, wherein said moving means includes a surface which moves with said movable lens mount and a surface which moves with said light blocking shield, said surfaces interacting as said movable lens mount is being retracted into a storage position to move said light blocking shield towards said normal position.

5. The camera of claim 1, wherein said moving means positions said light blocking shield in said normal position when said movable lens mount has been fully retracted into said storage position.

* * * * *